United States Patent [19]
Reichman et al.

[11] Patent Number: 5,017,446
[45] Date of Patent: May 21, 1991

[54] ELECTRODES CONTAINING CONDUCTIVE METAL OXIDES

[75] Inventors: Benjamin Reichman, Bayside; James I. Strebe, Germantown, both of Wis.

[73] Assignee: Globe-Union Inc., Milwaukee, Wis.

[21] Appl. No.: 426,580

[22] Filed: Oct. 24, 1989

[51] Int. Cl.$^5$ .............................................. H01M 4/68
[52] U.S. Cl. .................................. 421/225; 429/228; 252/182.1
[58] Field of Search .................. 429/225, 228; 252/182.1

[56] References Cited

U.S. PATENT DOCUMENTS 3,795,543  3/1974  Poe .................................. 429/145 X
4,326,017  4/1982  Will ..................................... 429/228

OTHER PUBLICATIONS

Derwent, Abstract #73-75583u, Matsushita Electric Co., Ltd. (1973), (Japanese 73/40167).
Derwent, Abstract #74-70468v, Matsushita Electric Co., Ltd. (1974) (Japanese 74/33816).
Derwent, Abstract #73-22928u, Bosch (1973) (W. German 2149524).
Kendall et al., "Properties and Applications of Electrode Materials Based on a New Process for Manufacture of $Ti_4O_7$ (Ebonex)", Brit. Ceram Proc (1989).

Primary Examiner—Stephen J. Kalafut
Attorney, Agent, or Firm—Foley & Lardner

[57] ABSTRACT

An electrode suitable for use as a lead-acid battery plate contains an inorganic metal oxide additive which enhances the formation of the plate. The additive is electrically conductive, stable in aqueous solutions of sulfuric acid, but does not participate in the electrode reaction. Suitable metal oxides include conductive oxides such as $TiO_{2-x}$, $WO_{3-x}$, $MoO_{3-x}$, $V_2O_{5-x}$, $Nb_2O_{5-x}$, wherein x is greater than 0 and less than or equal to 1, mixtures thereof and mixed conductive oxides of these elements. The conductive oxides may also be used in electrodes for bipolar lead-acid batteries.

28 Claims, 1 Drawing Sheet

ELECTRODES CONTAINING CONDUCTIVE METAL OXIDES

TECHNICAL FIELD

This invention relates to electrode materials of the type used in an acid electrolyte. More particularly this invention relates to conductive oxide electrode materials for use in a sulfuric acid electrolyte as an additive for lead-acid battery plates or as a bipolar substrate additive.

BACKGROUND OF THE INVENTION

Conventional lead acid battery plates include a positive electrode ($PbO_2$ plate) and a negative electrode (Pb plate) immersed in a sulfuric acid electrolyte and having a separator interposed therebetween. As a means of improving the ease of manufacture of such batteries, a variety of conductive additives have been proposed for incorporation into the plates. Lead dioxide has been proposed as an additive for paste mixtures containing tetrabasic lead sulfate, as described in Reich, U.S. Pat. No. 4,415,410, issued Nov. 15, 1983. Lead dioxide has also been formed in battery pastes by a reaction between lead monoxide and a persulfate salt (Reid, U.S. Pat. No. 2,159,226, issued May 23, 1939) or with ozone (Parker, U.S. Pat. No. 4,388,210, issued June 14, 1983, and Mahato et al, U.S. Pat. No. 4,656,706, issued Apr. 14, 1987). Lead dioxide enhances positive plate formation but provides no substantial advantages in the resulting battery because it participates in the positive plate reaction. During charging of the battery, lead sulfate is converted into lead dioxide, and the reverse reaction occurs during discharge.

Battery plate grids comprising a composite article on which a flowable plastics material is molded to engage portions of a conductive material, such as lead or a lead alloy, are also known. Buckethal et al, U.S. Pat. No. 4,118,553 issued Oct. 3, 1978. Also known is a lead-acid rechargeable cell having a positive electrode wherein a titanium alloy replaces lead as the supporting member for the active lead peroxide and is covered with a non-polarizing film of gold or other suitable material. See, Ruben, U.S. Pat. No. 3,615,831 issued Oct. 26, 1971.

Carbon has been used as a lead-acid paste additive, and has been used in combination with plastic materials in electrodes for bipolar lead-acid batteries, as described in Biddick, U.S. Pat. No. 4,098,967, issued Jul. 4, 1978. Carbon, however, is not stable as a positive electrode material because it tends to oxidize. Thus, bipolar electrodes solely utilizing carbon as the conductive filler are not generally satisfactory for long term use.

Unitary plate electrodes comprising fiberglass coated with tin dioxide, lead dioxide, and a thin film of lead or graphite filled resin are described in Rowlette et al, U.S. Pat. No. 4,547,443 issued Oct. 15, 1985. That use does not, however, suggest the uses of transition metal conductive oxides in the manner described herein The present invention involves the use of conductive oxides, preferably those of titanium, tungsten, molybdenum, vanadium and niobium. Certain oxides of these transition metals exist or can be prepared in a non-conductive state. Reduction of these non-conductive oxides, such as in a hydrogen atmosphere, at elevated temperatures, creates a conductive class of materials whose use in batteries or electrodes as described herein has not heretofore been recognized.

Certain conductive metal oxides have been used in applications, for example, in polymeric compositions for electrical components as described in Penneck et al, U.S. Pat. No. 4,470,898, issued Sept. 11, 1984, and in corrosion-resistant coatings as described in Tada, U.S. Pat. No. 4,352,899, issued Oct. 5, 1982.

Voss et al, in U.S. Pat. No. 3,096,215 issued Jul. 2, 1963 discloses the use of a sintered titanium dioxide electrode, impregnated with silver, as an auxiliary electrode for eliminating gases formed during operation of the battery. The electrode is formed with a cavity communicating with a gas space of the battery so that gas produced during formation or discharge can be absorbed. The auxiliary electrode is coupled electrically to the positive or negative plates of the battery, depending on which electrode is causing the problem gas generation.

Certain metal oxides have also been suggested for use in fuel cells to serve as substitutes for the more expensive platinum as a catalyst material See, Nestor, U.S. Pat. No. 3,480,479 issued Nov. 25, 1929 (a molybdenum oxide mixed with tungsten disulfide); Broyde, U.S. Pat. No. 3,544,378 issued Dec. 1, 1970 (a rare earth tungsten oxide $M_xWO_3$ where x is between 0 and 1 and M is a rare earth element).

An oxygen reducing negative active material for a storage cell which includes a molybdenum oxide having an average valency between 4 and 6 is discussed in Gabano et al, U.S. Pat. No. 3,871,917 issued Mar. 18, 1975. The oxide is supported by mechanical compression. A conductive body (e.g. graphite) and binding agents may be employed. The material is used with conventional positive electrode systems (i.e., $PbO_2$,$PbSO_4$/$H_2SO_4$,$H_2O$.

Further, the use of bulk titanium oxide having the formula $TiO_x$ where x is 1.55 to 1.95 has been suggested for electrode use in electrochemical cells. See, Hayfield, U.S. Pat. No. 4,422,917 issued Dec. 27, 1983. Solid, bulk titanium oxide materials are discussed for electrode applications including storage batteries, bipolar cells for chlorate production, etc.

Tin dioxide ($SnO_2$) has also been suggested as a coating for fiberglass strands of unitary electrodes. See, for example, Rowlette et al, U.S. Pat. No. 4,547,443, issued Oct. 15, 1985 This coating has proven somewhat useful, but it fails to completely meet the need for a conductive additive which is economical, enhances plate formation and also improves the properties of the resulting lead-acid battery.

The present invention provides novel electrodes used in lead-acid batteries which are not appreciated by the foregoing art and which overcome the deficiencies of the aforementioned systems.

SUMMARY OF THE INVENTION

The invention provides an electrode containing an electrically conductive material, specifically a sulfuric acid-resistant, inorganic metal oxide, preferably a transition metal oxide in a reduced state, for example, certain oxides of titanium, tungsten, molybdenum, vanadium and niobium, mixtures of these conductive oxides, or conductive mixed oxides of these elements. Electrodes according to the invention include lead-acid battery electrodes, such as plates, tubular electrodes or bipolar electrodes.

In a positive lead-acid battery plate of the invention, the conductive material serves as an additive which enhances the formation of a lead-acid battery plate. The conductive material in combination with a binder may also serve as a plate support grid. The conductive material additive does not participate in the electrode reaction, for example, in the manner of lead dioxide in positive lead-acid battery plates, but rather serves only as a conductive material. An electrode according to the invention is especially suitable for use as the positive plate of a lead-acid battery in combination with a negative plate containing carbon as the conductive additive.

According to further aspects of the invention, a bipolar electrode for use in a bipolar lead-acid battery includes a substrate and layers of positive and negative active material disposed on opposite sides of the substrate. The substrate contains the foregoing conductive oxide as a filler, and a polymeric binder.

BRIEF DESCRIPTION OF THE DRAWING

The invention will be further described with reference to the accompanying drawing, wherein like numerals denote like elements, and.

DETAILED DESCRIPTION

Figure 1:
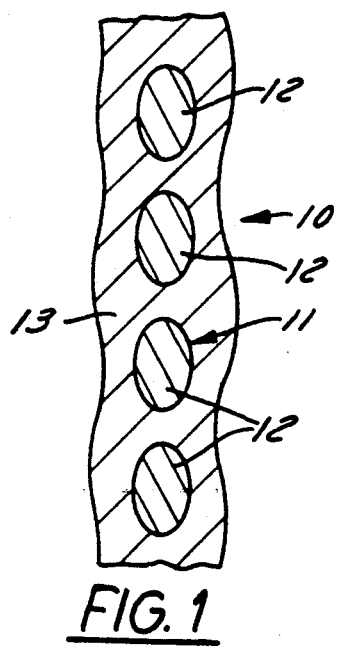
FIG. 1 is a partial, cross-sectional view of a lead-acid battery plate according to the invention.

According to the invention, an electrically conductive oxide selected from the class of inorganic oxides generally known as being non-conductive are used in electrodes, especially in electrodes for use in sulfuric acid electrolytes. For such uses, the oxide must first be converted to a conductive state. Conductivity is essential to enhancing lead-acid battery plate formation and for use as an electrode in electrolytic processes. For purposes of the present invention, "conductive" means a conductivity of at least about 0.1 ohm$^{-1}$cm$^{-1}$, preferably at least about 10 ohm$^{-1}$cm$^{-1}$. The processes for converting the oxides to their conductive states are described below.

Second, the oxide should be stable in water and aqueous sulfuric acid solutions. For purposes of the present invention, "sulfuric acid-resistant" means stable in dilute aqueous sulfuric acid having specific gravities in the range of about 1 to 1.4, as commonly used in lead-acid batteries, at temperatures in the range of about $-40°$ C. to 80° C. Stability in up to 12 molar sulfuric acid solution at such temperatures is preferred. If the oxide is attacked by the acid electrolyte, the structure of the resulting plate will be adversely affected.

Finally, the oxide usually needs to be electrochemically inert, i.e., it should not participate in the electrochemical reaction occurring in the battery or electrolytic process. Absent this characteristic, the oxide has no lasting effects in the battery, or is consumed as part of the electrolytic process.

When used in a positive electrode in a lead-acid battery, the conductive oxide according to the invention preferably has an oxygen overpotential about the same as or greater than lead dioxide under like conditions, particularly when used in a lead-acid battery wherein the sulfuric acid electrolyte has a specific gravity in the range of about 1.001 to 1.4 at a temperature in the range of from about 20° C. to 80° C., especially $-40°$ C. to 80° C.

Few inorganic oxides have all of the foregoing characteristics. Several are described in commonly owned, co-pending U.S. patent application Ser. No. 07/345,993 filed May 2, 1989 and entitled "Electrodes Containing Conductive Metal Oxides" by N. K. Bullock and W. Kao. Barium metaplumbate is the preferred material in that application which principally involves perovskite structure oxides of the formula

$$A_a B_b O_c$$

wherein A is Sr, Ba, Zn, Cd, Ra or a combination thereof, B is Zr, Sn, or Pb, and $0.5 \leq a \leq 1$, $0.5 \leq b \leq 1$, and $2 \leq c \leq 3$, optionally containing small amounts of other elements such as Bi, Ag, K, Li, Ti, Nb, Al, Cr, Zn, Mn, Mg or Ca, and the resulting compound is substantially stable in sulfuric acid, has a conductivity of at least about 0.1 ohm$^{-1}$cm$^{-1}$, and can be used as an electrode in an aqueous sulfuric acid solution without generating excessive oxygen when used in a positive electrode, or without reacting to generate excessive hydrogen if used as a negative electrode.

The transition metals include elements from Sc to Cu, Y to Ag and Hf to Au in the first, second and third series, respectively. According to the invention, it has been discovered that a variety of transition metal oxides can be prepared which are both sulfuric acid resistant and electrically conductive. These compounds tend to be transition metal oxides wherein the metal is in an oxidation state lower than its group oxidation state. For example, the transition metals of Groups 4, 5 and 6 typically form stable, non-conductive oxides such as $TiO_2$, $WO_3$, $MoO_3$, $V_2O_5$, and $Nb_2O_5$. In each of these compounds the metal is in its group oxidation state, namely (IV) for Ti, (V) for V and Nb, and (VI) for W. By contrast, reduced metal oxides, such as TiO, $Ti_2O_3$, VO, $V_2O_3$, $VO_2$, $WO_2$, $W_2O_5$, $MoO_2$, $Mo_2O_5$, and $NbO_2$, wherein the metal atom is in an oxidation state lower than its group oxidation state, are electrically conductive.

In the present invention oxides of titanium, tungsten, molybdenum, vanadium and niobium which are non-conductive in their most stable form, i.e. when the metal is in its group oxidation state, can be converted to conductive metal oxides by, for example, reducing stoichiometric powders in a hydrogen atmosphere at elevated temperatures. Such techniques are, in and of themselves, well known and need not be described in detail herein (see, for example, the aforementioned Gabano and Hayfield patents).

For definitional purposes, the materials which are useful in the present invention will be described as "conductive oxides". The most preferred conductive oxides for use in the invention include conductive oxides of titanium, tungsten, molybdenum, vanadium and niobium represented by the formulas $TiO_{2-x}$, $WO_{3-x}$, $MoO_{3-x}$, $V_2O_{5-x}$ and $Nb_2O_{5-x}$ where x is greater than 0 and less than or equal to 1, particularly about 0.001 to 1, mixtures thereof, and the conductive mixed oxides of these elements. For $V_2O_{5-x}$, x may range from 0.001 to 3, although the range of 0.001 to 1 is preferred.

The reduction temperatures used for the preparation of the various conductive oxides may vary between about 300° C. to over 1000° C., and the amount of reduction may be selected to optimize conductivity properties for the desired application. As will more fully be discussed below, if binders are used, resistivity may be controlled by varying both or either the stoichiometry or the percentage of the conductive oxide used in the binder. For example, using a conductive tungsten oxide $WO_2$ (commercial grade, for example), resistivity drops from 1.70 ohm-cm at 22.5% (volume percent) in a polyethylene binder to 0.033 ohm-cm at 53.8% (volume percent) conductive oxide powder. Particle size will also affect resistivity.

Lead-acid battery electrodes are commonly made by applying a paste containing lead compounds to a lead grid. The conductive oxides of the invention may be incorporated directly into positive lead-acid battery paste mixtures. In such pastes, the amount of the conductive oxide according to the invention, based on the total solids is generally in the range of from about 0.01 to 50 wt. %, preferably about 0.05 to 8 wt. % for positive plates. Formation enhancement effects level out at about 8 wt. % and at concentrations less than 0.1%, the improvement in formation becomes minimal.

The conductive oxides of the invention are conveniently added to the paste mixture in powder form. The particle size of the conductive oxides used to make a paste according to the invention is not critical, but the particles should generally be sufficiently small to allow the conductive oxide to be evenly distributed throughout the paste and in the resulting layer of positive active material. Conductive oxide particles ground to an average particle size (diameter) in the range of from about 0.1 to 300 microns, more preferably from about 0.1 to 40 microns are useful for purposes of the present invention. The conductive oxides can also be used in other forms, for example, as a coating for fibers or as a composite material.

It is not usually necessary that the conductive oxides according to the invention for use in lead-acid battery plates be of high purity. Impurities such as unreduced starting materials may be present. However, the purity of the oxide should be taken into account when determining the amount to be used.

Standard paste ingredients, including lead oxide ($PbO$, $Pb_3O_4$, etc.), sulfuric acid, water and various well-known additives, such as fibers and expanders, may be used in conventional amounts. A solid mixture for making a battery paste according to the invention may contain, as solids, up to 0.5 wt. %, especially 0.05 to 0.4 wt. % fiber, 0.01 to 50 wt. % of the conductive oxide according to the present invention, and the balance lead oxide(s), including any free lead present in the lead oxide. Preferably, these ranges are 0.05 to 0.4 wt. % fiber, 0.05 to 8 wt. % of the conductive oxide according to the invention, and the balance lead oxides.

Fibers may be used in positive paste mixes as a binder to improve the handling characteristics of the battery plates after pasting. Suitable fibers include fiberglass, tin or tin dioxide-coated fiberglass, carbon fibers, synthetic plastic fibers such as modacrylic fibers, and mixtures thereof. Such fibers typically have a fineness of about 2 to 4 denier and lengths in the range of 0.15 to 0.35 cm. The density of the modacrylic fibers useful in pastes according to the invention is in the range of about 1.2 to 1.5 g/cc.

In one embodiment of a lead-acid battery according to the present invention, the positive electrode contains a conductive oxide according to the invention and the negative electrode does not. However, negative plate formation poses problems if the lead oxide used to make the paste has a very low free lead content, i.e. less than about 0.2 wt. % of the lead oxide. This problem can be remedied by incorporating therein an amount of high surface area carbon (or other expanders) effective to enhance the formation process without adversely affecting battery performance. For this purpose, from about 0.05 to 0.5 wt. %, especially 0.1 to 0.2 wt. % of carbon, based on the total solids present may be incorporated into the negative paste mixture. The foregoing amounts are in addition to any carbon already present in the expander mixture.

A typical paste mixture according to the invention contains (1) a lead sulfate compound selected from lead sulfate, and mono-, tri- or tetrabasic lead sulfate, (2) a lead oxide compound selected from o-PbO, t-PbO, and $Pb_3O_4$, (3) an amount of the conductive oxide material according to the invention sufficient to enhance the formation and/or other properties of the resulting plate, (4) water in an amount effective to provide a flowable paste, and optionally (5) other additives such as carbon and fiber. A preferred battery paste for making positive plates according to the invention contains, as solids and after a portion of the initial lead monoxide has reacted with sulfuric acid to form lead sulfate(s), about 55-60 wt. % lead sulfate or basic lead sulfate(s), 40-44 wt. % PbO, and 0.05-8 wt. % of the conductive oxide according to the invention, optionally also including 0.1 to 0.2 wt. % of carbon, and 0.001-0.002 wt. % fiber. The water content of such a paste is in the range of about 0.15-0.2 ml/g of solids.

Battery plates used in lead-acid batteries according to the invention may be made by any well-known process, for example, by applying the foregoing paste to the surface of a battery plate grid and forming the paste into an active material. In general, the paste is made by adding sulfuric acid and water to lead oxide to form lead sulfate or basic lead sulfate compounds in a mixture with excess unreacted lead oxide, optionally containing free lead, lead dioxide, and other conventional additives. This may be done by first weighing out a predetermined amount of lead oxide into a weigh hopper and dumping the lead oxide into a batch mixer, such as a mulling mixer. Dry additives such as fiber, expander and the conductive oxide according to the invention are directly added into the mixer. The resulting mixture is dry mixed for several minutes so that the additives are dispersed throughout the lead oxide. Water is then added as needed to make a paste of the desired consistency. Excessively moist or dry paste renders pasting impossible. The wet mixture is mixed for a short time to wet out the lead oxide. Sulfuric acid is then added as mixing continues until the temperature peaks at about 65° C. and then drops to the range of 43°-49° C. The acid is added gradually to prevent the paste from overheating. The resulting paste is then cooled by evaporation of water and conduction to the mixer. Such a lead-acid battery paste is generally made in a batch reactor, although continuous processes have been proposed and could be used.

Referring to FIG. 1, an electrode (positive plate) 10 of the invention is made by the conventional process of applying the foregoing paste to a flat grid 11 comprising grid elements 12 made of a lead alloy, such as lead-antimony or lead-calcium. The conductive oxide according to the present invention is then incorporated into the paste. The plate is then, if necessary, flash-dried and cured. Thereafter, the plate is formed (charged) to obtain a layer of active material 13 containing the conductive oxide of the invention homogenously dispersed therein. Formation may be carried out either before or after the plate is assembled into a battery casing together with a negative plate, a separator, and the electrolyte.

Another method of making a positive battery plate, commonly called the tubular plate process, is used in the manufacture of traction and stationary batteries. In this process, tubes are constructed from woven, braided or felt polyester, glass, or other sulfuric acid and oxygen-resistant fibers. The tubes are shaped in a suitable solution under thermal treatment. The current collector, commonly called the spine, is a hard lead alloy rod centered in each tube by, for example, star protrusions. The spine is typically made by casting molten lead under high pressure. The tubes are pulled over the spines and then filled with lead oxide materials such as t-PbO and o-PbO mixed with $Pb_3O_4$ in either a powder or slurry form. The lead oxide mixture is vibrated to settle it into a more compact form inside the tube.

Following the tube filling process, the tubular plate is immersed in sulfuric acid solution for several days. During this process, lead sulfate and basic lead sulfates form and $Pb_3O_4$ decomposes to lead sulfate materials and $PbO_2$, thus enhancing the conductivity of the paste. The use of $Pb_3O_4$ thus improves the efficiency of the formation process by forming $PbO_2$. In a tubular electrode according to the present invention, the conductive oxide of the invention is incorporated into the lead oxide mixture, reducing or eliminating the need to add $Pb_3O_4$.

Figure 2:
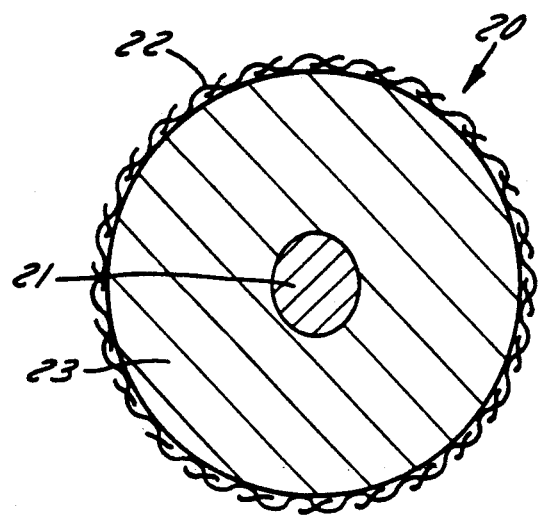
FIG. 2 is a cross-sectional view of a tubular lead-acid battery electrode according to the invention.

FIG. 2 illustates a tubular electrode 20 of the invention made according to the foregoing process for use in a lead-acid battery Electrode 20 includes a central current collector rod 21, a tubular sheath of fabric mesh 22, and annular layer of active material 23 interposed between collector 21 and mesh 22. Active layer 23 contains a conductive oxide material according to the invention. An electrode of this type need not be symmetrical, and can include a series of spaced collectors 21.

Figure 3:
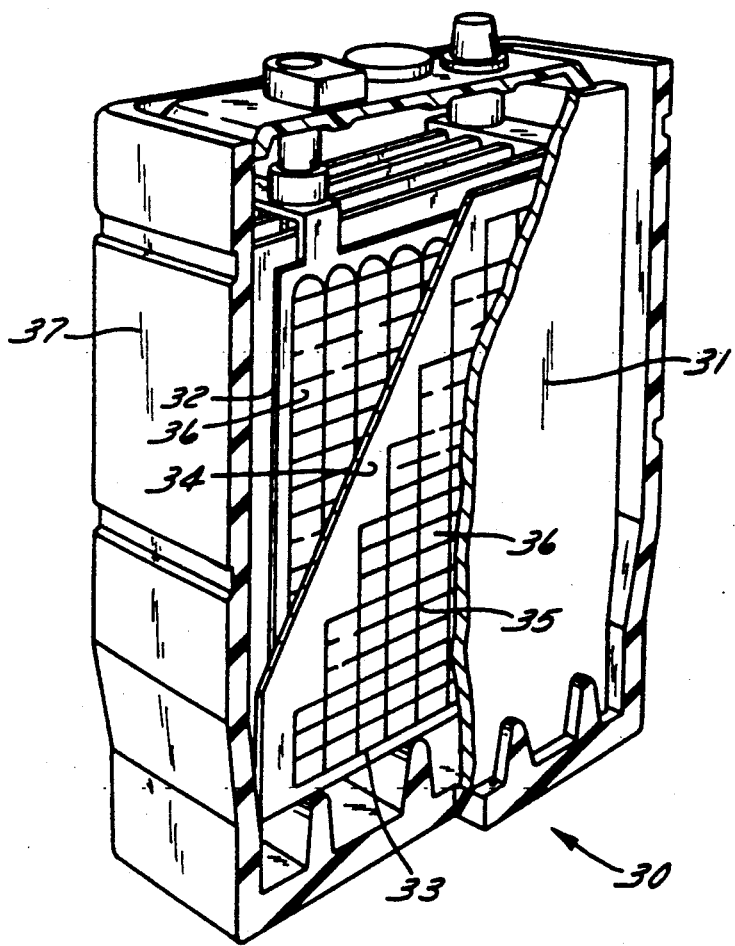
FIG. 3 is a perspective, cut-away view of a lead-acid battery acccording to the invention.

Referring to FIG. 3, the foregoing electrode plates are combined with several other components to make the lead-acid battery 30. Battery 30 according to the invention includes a conventional casing 37 which houses two or more cells defined by a partition 31. Each cell includes a positive lead dioxide electrode 32 containing a conductive oxide according to the invention, a negative lead electrode 33, a separator 34 interposed between the electrodes, and an aqueous sulfuric acid electrolyte in which the electrodes and separator are immersed. Electrodes 32, 33 each comprise lead alloy grids 35 having active material 36 deposited thereon. The casing, separator, negative electrode (plate) and the electrolyte may be of conventional design and need not be described in detail. See, for example, Biagetti, U.S. Pat. No. 3,765,943, issued Oct. 16, 1973, the contents of which are hereby expressly incorporated by reference herein. The electrolyte may be a liquid, or may be gelled or immobilized by absorption in the separator.

A conductive oxide according to the invention can also be used as a filler material in a bipolar electrode substrate for a bipolar lead-acid battery, for example, of the type described in Biddick, U.S. Pat. No. 4,098,967 or Poe, U.S. Pat. No. 3,795,543, the entire contents of which patents are hereby expressly incorporated herein by reference.

Figure 4:
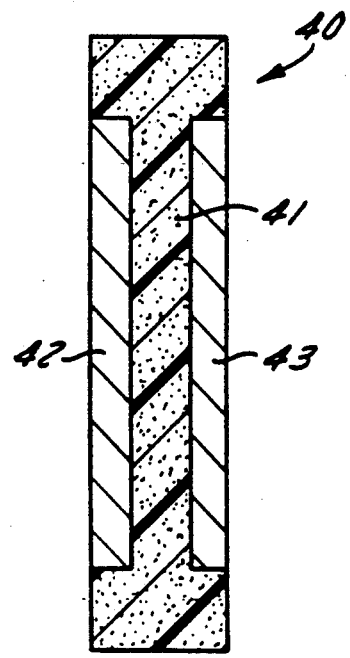
FIG. 4 is a cross-sectional view of a bipolar lead-acid battery electrode according to the invention.

Referring to FIG. 4, a bipolar electrode 40 of the invention generally comprises a substrate (plate) 41 made of a sulfuric acid-resistant plastic matrix in which fine particles of the conductive oxide are dispersed. Layers 42, 43 of positive and negative active lead materials, respectively, are formed on opposite sides of substrate 41. The average particle size of the particles used in substrate 41 is generally in the range of from about 0.1 to 300 microns, preferably from about 0.1 to 40 microns, and more preferably from 0.1 to 5 microns. For purposes of the present invention, polyethylene, polypropylene, fluorinated derivatives thereof, and similar plastics having suitable strength and resistance to sulfuric acid can be used. In particular, a preferred polyethylene according to the invention has a molecular weight of from 200,000 to 300,000, a peak melting point of about 135° C. or higher, and a strength of from 3000 to 5000 psi. Such PE plastic also typically has a conductivity of about $10^{-16}$ ohm$^{-1}$cm$^{-1}$, a density of about 0.96 g/cm$^3$, and an elastic modulus of about 50,000–80,000 psi.

In a bipolar battery according to the invention, the carbon filler described in the Biddick et al. patent is replaced with a conductive oxide according to the invention in comparable amounts, for example about 10 to about 95% by volume, particularly about 15 to about 60% by volume in the bipolar electrode. Otherwise, a bipolar battery of like configuration to Biddick et al, including a stack of bipolar electrodes coated on opposite sides with positive and negative lead-acid active materials and having separators interposed therebetween, may be constructed according to the present invention.

A conductive oxide of the present invention accordingly can avoid the drawbacks of carbon as a conductive additive for a bipolar electrode. For example, a large amount of carbon must be used to obtain the desired level of conductivity, but this can make the resulting material too porous for use as a bipolar electrode substrate. Carbon also has poor stability in sulfuric acid electrolyte when used in a positive electrode.

Several embodiments of the invention are hereafter illustrated in the following experimental examples:

EXAMPLE 1

Certain conductive oxides of tungsten were prepared in a polyethylene matrix and the resistivity of the resultant material was determined as shown in Table I. The materials were prepared by first reducing non-conductive $WO_3$ to various levels, thereby obtaining a conductive oxide powder. Thereafter from about 25% to about 35%, by volume, of the conductive oxide powder was added to melted polyethylene. The mixture was then mixed until a consistent mass was obtained. The mass was allowed to dry. Then the 4-point resistivity of the mass was obtained. The results indicated that conductive oxides having the general formula $WO_{3-x}$, wherein x is greater than 0 and less than or equal to 1, have excellent conductive properties.

TABLE I

| Conductive Oxide | Volume % Oxide | Density (g/cm$^3$) | Resistivity (ohm-cm) |
| --- | --- | --- | --- |
| $WO_{2.89}$ | 33.5 | 7.17 | 2.04 |
| $WO_{2.55}$ | 30.2 | 8.3 | 0.52 |
| $WO_{2.39}$ | 30.2 | 8.45 | 0.45 |
| $WO_2$ | 25.2 | 10.75 | 0.38 |

EXAMPLE 2

A control paste (100 grams) was prepared by combining the following ingredients:

| | |
|---|---|
| o-PbO (powder, no free lead) | 78.0 gm |
| Sulfuric acid, specific gravity 1.325 | 6.6 ml |
| Modacrylic fibers, 1/16" long, 1.3 gm/cc | 0.05 gm |
| Water | 12.8 ml |

The sulfuric acid used contained about 42–43% by weight acid, the balance being water. The solids were premixed. The water was then added to the dry mixture followed by thorough mixing to obtain a uniform consistency. The acid was added last and mixed therein to cause the sulfate reaction to proceed. Mixing continued to obtain a uniform paste.

A paste according to the invention was prepared in the same manner, except that 3.9 gm (about 5 wt. % based on the solids) of $TiO_{1.77}$ powder was added to the mixture.

The control and test pastes were uniformly coated on respective conventional lead-calcium alloy electrode grids of dimensions 6 by 4 by 0.13 cm to a thickness of about 0.1 to 0.15 cm, and allowed to dry by standing at room temperature over night. The resulting grids (7 controls and 7 plates according to the invention) contained about 11–13 grams of active material.

The grids were immersed in 150 ml of 1.185 specific gravity (SG) aqueous sulfuric acid in a standard lead acid battery including a pair of negative plates and a polypropylene separator, so that the positive plate was sandwiched between the two negative plates and separated therefrom by the separator, which was folded over both sides of the negative plate. A $Hg/Hg_2SO_4$ reference electrode was also immersed in the acid electrolyte to one side of the test element. A current of 700 mA, which amounted to about 13.3 mA/cm$^2$ when both sides of the positive grid were included, was applied to affect formation of the plates. Formation was continued for 8 hours. The plates according to the invention were completely formed at the end of this time period. The control plates, however, were not completely formed, as indicated by their appearance.

After formation, the plates were discharged at a 2 hour rate and the capacity of the plates was determined. The percent of $PbO_2$ utilized was then calculated based upon the capacity. The plates according to the invention showed significant formation enhancement with the formation efficiency being very near 100%. Particularly, the plate according to the invention utilized 35–38% of the $PbO_2$ while the control o-PbO plates utilized only 8–10% of the $PbO_2$.

EXAMPLE 3

Several o-PbO plates having a paste coating according to the invention were prepared as described in Example 2. These plates and chemset plates (conventional battery plates) were immersed in 1.265 specific gravity sulfuric acid in sufficient quantity to completely cover the plate. The plates were then formed by conventional procedures. Thereafter, the plates were discharged, at a 2-hour rate, to a cut-off voltage of 1.75 volts. The capacities of the discharged plates were then determined. Then, the plates were recharged at a 2-hour rate with a 10% overcharge. This process of discharging, determining capacity, and recharging was repeated numerous times to determine the cycle life of the plates according to the invention as compared to conventional lead acid battery plates. The results indicated that the plates according to the invention were comparable to conventional battery plates in terms of cycle life. Thus, the plates according to the invention were found to enhance formation (as set forth in Example 2) with little to no effect on cycle life.

EXAMPLE 4

Several conductive tungsten oxides according to the present invention having various stoichiometries were obtained by heating commercial grade $WO_3$ at various temperatures for various lengths of time, thus reducing the compound in accordance with the invention. The stabilities of each of the resulting powders were then determined by digesting a predetermined weight of the powder mixed with an equal weight of $PbO_2$ in sulfuric acid having a specific gravity of 1.305 g/cm$^3$. The percent of the material which dissolved was determined after 9 days in those tests conducted at room temperature, and after 7 days in tests conducted at elevated temperatures. The results obtained are provided in Table II below. The data for commercial grade $WO_3$ is provided for comparison. Nearly all percentage values obtained were under the threshold value of 1%, indicating that the conductive oxide compounds according to the present invention are stable.

TABLE II

| Material | Temp. (°C.) | Time/Days | % Dissolved |
|---|---|---|---|
| $WO_3$ | 20 | 9 | 0.1 |
| | 60 | 7 | 0.1 |
| $WO_{2.9}$ | 20 | 9 | 0.7 |
| | 60 | 7 | 0.8 |
| $WO_{2.6}$ | 20 | 9 | 1.1 |
| | 60 | 7 | 0.9 |
| $WO_2$ | 20 | 9 | 0.5 |
| | 40 | 7 | 0.6 |
| | 60 | 7 | 0.4 |

EXAMPLE 5

Several samples of titanium dioxide ($TiO_2$) powder were reduced at various elevated temperatures and under a hydrogen atmosphere to various stoichiometries. Two of these samples were then incorporated into a polyethylene matrix by the process described in Example 1 in the amount of 60% (volume percent). The resistivities of the resultant products, in either pure form or in a polyethylene matrix, were then determined as shown in Table III below.

TABLE III

| Reduction Temperature (°C.) | Resultant Stoichiometry | Resistivity (ohm-cm) |
|---|---|---|
| 850 | *$TiO_{1.86}$ | $10^6$ |
| 1100 | *$TiO_{1.77}$ | 1.0 |
| 1100 | **$TiO_{1.8}$ | 2.31 |
| 1160 | **$TiO_{1.76}$ | 0.86 |

*Denotes pure material
**Denotes conductive oxide in polyethylene matrix

EXAMPLE 6

A 150 ml beaker was placed on a 370° C. hot plate, covered with a watchglass, and allowed to heat. 2.0 g of polyethylene (melting index=45) were added to the beaker and melted. Enough conductive oxide having the general formula $TiO_{1.77}$ was added to yield a resultant mixture containing 60% by volume of conductive oxide. The mixture was rubbed, mixed, and kneaded with a broadbladed steel spatula until a consistent mass was obtained. The mass was placed into a mold (preheated to 370° C. on a hot plate) and pressure was slowly applied with a press until the material flowed from the vent (between 5,000 and 10,000 psi). The mold was cooled while in the press with water circulated through the platens. The resulting sheet substrate contained about 60% by volume powdered $TiO_{1.77}$ in polyethylene. The sheet substrate was then immersed in a container filled with sulfuric acid having a specific gravity of 1.265. A constant voltage of 1.35 V vs. a $Hg/Hg_2SO_4$ reference was applied for 200 hours. The resistivity of the sheet substrate was periodically tested, as was the corrosion current within the container. It was observed that over the test period the corrosion current stayed low and the resistivity stabilized to about 9.2 ohm-cm at 200 hours.

EXAMPLE 7

Samples of conductive oxides according to the invention were prepared to determine the effect on conductivity of volume percent of conductive oxide in a binder, such as polyethylene. Particularly, conductive oxides of molybdenum and tungsten were prepared by reduction of the $MoO_3$ and $WO_3$ in a hydrogen atmosphere. Varying amounts of the resultant powders having the general formulas of $MoO_{3-x}$ and $WO_{3-x}$ wherein X is greater than 0 and less than or equal to 1 were added to a polyethylene matrix as described in Example 1. The resisitivities of the various products were then determined, and the results are shown in Table IV below. It is clear that the resistivity of the conductive oxides according to the present invention when used in binders is dependent upon the volume percent of the conductive oxide.

TABLE IV

| Conductive Oxide | Volume % of Conductive Oxide | Resistivity (ohm-cm) |
| --- | --- | --- |
| $WO_2$ | 22.5 | 1.70 |
|  | 25.8 | 0.66 |
|  | 33.3 | 0.30 |
|  | 53.8 | 0.03 |
| $MoO_{2.12}$ | 15.0 | 29.41 |
|  | 20.0 | 0.11 |
|  | 30 0 | 0.01 |

EXAMPLE 8

A conductive oxide of niobium having the general formula $Nb_2O_{4.55}$ was prepared in a polyethylene matrix, as described in Example 1. About 57% (volume percent) of the conductive oxide was utilized in the polyethylene matrix. The resistivity of this resultant material as determined by using the 4-point resistivity test was found to be 3.3 kilo-ohm-cm. This resistivity illustrates that conductive oxides of the invention having the formula $Nb_2O_{5-x}$, where x is greater than 0 and less than or equal to 1, have fair to good conductive properties.

It will be understood that the foregoing description is of preferred exemplary embodiments of the invention, and that the invention is not limited to the specific forms described. Modifications may be made to the methods and materials disclosed without departing from the scope of the invention as expressed in the appended claims.

What is claimed is:

1. In an electrode including a conductive current collector and an active lead material in contact with said collector, the improvement wherein said active material contains an electrically conductive, sulfuric acid-resistant transition metal oxide.

2. The electrode of claim 1, wherein said conductive metal oxide has an oxygen overpotential about the same as or greater than $PbO_2$ when employed under like conditions in a positive electrode of a lead-sulfuric acid battery.

3. The electrode of claim 1, wherein said active lead material contains about 0.1 to 50 wt. % of said conductive metal oxide.

4. The electrode of claim 1, wherein said electrode is a positive electrode in which said collector consists essentially of lead, and said active lead material comprises a lead sulfate compound which is converted to lead dioxide when said electrode is charged in a lead-sulfuric acid battery.

5. The electrode of claim 4, wherein said collector comprises a generally flat grid, and said active lead material forms a layer on said grid.

6. The electrode of claim 4, wherein said collector comprises an elongated rod, said electrode further comprises a sheath made of a sulfuric acid-resistant fiber mesh, and said active lead material is disposed between said collector and said sheath.

7. The electrode of claim 3, wherein said active lead material contains from about 0.1 to 8 wt. % of said conductive metal oxide.

8. The electrode of claim 1, wherein said transition metal oxide comprises oxides of transition elements of Groups 4, 5 or 6, mixtures thereof, and conductive mixed oxides of these elements.

9. The electrode of claim 1, wherein said transition metal oxide comprises $WO_{3-x}$, wherein x is greater than 0 and less than or equal to 1.

10. The electrode of claim 1, wherein said transition metal oxide comprises $V_2O_{5-x}$, wherein x is greater than 0 and less than or equal to 1.

11. In a lead-acid battery including a casing, positive and negative electrodes disposed in said casing, a separator interposed between said electrodes, and a sulfuric acid electrolyte in contact with said electrodes and separator, the improvement comprising:
   said positive electrode comprising a current collector and an active lead material in contact with said collector, said active lead material containing an electrically conductive, sulfuric acid-resistant transition metal oxide.

12. The battery of claim 11, wherein said current collector comprises a grid essentially of lead, and said active lead material comprises a layer on said grid and contains lead sulfate which is converted to lead dioxide when said electrode is charged in a lead-sulfuric acid battery.

13. The battery of claim 11, wherein the improvement further comprises said negative electrode containing carbon therein.

14. The battery of claim 11, wherein said active lead material contains from about 0.1 to 8 wt. % of said conductive metal oxide.

15. A paste mixture, comprising particles of a lead oxide compound, a lead sulfate compound, and a conductive, sulfuric acid-resistant, transition metal oxide.

16. The paste mixture of claim 15, wherein said particles are dispersed in an amount of water effective to form a paste.

17. The paste mixture of claim 16, wherein said lead oxide compound is selected from the group consisting of $PbO$, $Pb_3O_4$, and mixtures thereof, said lead sulfate compound is selected from the group consisting of PbSO$_4$, PbO.PbSO$_4$, 3PbO.PbSO$_4$.H$_2$O, 4PbO.PbSO$_4$, and mixtures thereof.

18. The paste mixture of claim 17, wherein solids in said paste consist essentially or 0.01 to 50 wt. % of said conductive metal oxide, up to about 0.5 wt. % of a fiber, and the balance is said lead oxide compound and said lead sulfate compound, and the amount of water in said paste is in the range of about 0.15 to 0.2 ml/g of said solids.

19. In a bipolar electrode for use in a lead-acid bipolar battery, including a conductive substrate having a pair of layers of positive and negative active material disposed on opposite sides thereof, the improvement wherein said substrate comprises:
particles of an electrically conductive, transition metal oxide which is substantially stable in aqueous sulfuric acid; and
a substantially sulfuric acid-resistant matrix in which said conductive particles are dispersed.

20. The bipolar electrode of claim 19, wherein said matrix comprises polyethylene.

21. In an electrode including a conductive current collector and an active lead material in contact with said collector, the improvement wherein said active material contains an electrically conductive, sulfuric acid-resistant transition metal oxide having the formula TiO$_{2-x}$, wherein X is greater than 0 and less than or equal to 1.

22. In an electrode including a conductive current collector and an active lead material in contact with said collector, the improvement wherein said active material contains an electrically conductive, sulfuric acid-resistant transition metal oxide having the formula MoO$_{3-x}$, wherein x is greater than 0 and less than or equal to 1.

23. In an electrode including a conductive current collector and an active lead material in contact with said collector, the improvement wherein said active material contains an electrically conductive, sulfuric acid-resistant transition metal oxide having the formula Nb$_2$O$_{5-x}$, wherein x is greater than 0 and less than or equal to 1.

24. In a bipolar electrode for use in a lead-acid bipolar battery, including a conductive substrate having a pair of layers of positive and negative active material disposed on opposite sides thereof, the improvement wherein said substrate comprises:
particles of an electrically conductive oxide which is substantially stable in aqueous sulfuric acid having the formula TiO$_{2-x}$, wherein x is greater than 0 and less then or equal to 1; and
a substantially sulfuric acid-resistant matrix in which said conductive particles are dispersed.

25. In a bipolar electrode for use in a lead-acid bipolar battery, including a conductive substrate having a pair of layers of positive and negative active material disposed on opposite sides thereof, the improvement wherein said substrate comprises:
particles of an electrically conductive oxide which is substantially stable in aqueous sulfuric acid having the formula MoO$_{3-x}$, wherein x is greater than 0 and less then or equal to 1; and
a substantially sulfuric acid-resistant matrix in which said conductive particles are dispersed.

26. In a bipolar electrode for use in a lead-acid bipolar battery, including a conductive substrate having a pair of layers of positive and negative active material disposed on opposite sides thereof, the improvement wherein said substrate comprises:
particles of an electrically conductive oxide which is substantially stable in aqueous sulfuric acid having the formula Nb$_2$O$_{5-x}$, wherein x is greater than 0 and less than or equal to 1; and
a substantially sulfuric acid-resistant matrix in which said conductive particles are dispersed.

27. In a lead-acid battery including a casing, positive and negative electrodes disposed in said casing, a separator interposed between said electrodes, and a sulfuric acid electrolyte in contact with said electrodes and separator, the improvement comprising:
said positive electrode comprising a current collector and an active lead material in contact with said collector, said active lead material containing an electrically conductive, sulfuric acid-resistant transition metal oxide selected from the group consisting of TiO$_{2-x}$, MoO$_{3-x}$, Nb$_2$O$_{5-x}$, mixtures thereof and mixed conductive oxides of these elements, wherein x is greater than 0 and less than or equal to 1.

28. A paste mixture, comprising particles of a lead oxide compound, a lead sulfate compound, and a conductive, sulfuric acid-resistant, transition metal oxide selected from the group consisting of TiO$_{2-x}$, MoO$_{3-x}$, Nb$_2$O$_{5-x}$, mixtures thereof and mixed conductive oxides of these elements, wherein x is greater than 0 and less than or equal to 1, said particles being dispersed in an amount of water effective to form a paste.

* * * * *

UNITED STATES PATENT AND TRADEMARK OFFICE
CERTIFICATE OF CORRECTION

PATENT NO. : 5,017,446

DATED : May 21, 1991

INVENTOR(S) : Benjamin Reichman; James I. Strebe

It is certified that error appears in the above-identified patent and that said Letters Patent is hereby corrected as shown below:

In claim 12, line 2, the word -- consisting -- should appear after the word "grid".

In claim 18, line 2, the word -- of -- should appear after the word "essentially" and in lieu of the word "or".

In claim 21, line 6, the letter -- x -- should appear after the word "wherein" and in lieu of the letter "X".

Signed and Sealed this

Twenty-second Day of September, 1992

*Attest:*

DOUGLAS B. COMER

*Attesting Officer*       *Acting Commissioner of Patents and Trademarks*